(12) United States Patent
Johnson (10) Patent No.: US 6,792,338 B2
(45) Date of Patent: Sep. 14, 2004

(54) SYSTEM AND METHOD FOR ACTIVELY LIMITING THE POWER DRAWN FROM A POWER DISTRIBUTION BUS

(75) Inventor: Andrew T Johnson, Scottsdale, AZ (US)

(73) Assignee: Honeywell International, Inc., Morristown, NJ (US)

(*) Notice: Subject to any disclaimer, the term of this patent is extended or adjusted under 35 U.S.C. 154(b) by 376 days.

(21) Appl. No.: 09/828,561

(22) Filed: Apr. 6, 2001

(65) Prior Publication Data

US 2002/0147529 A1 Oct. 10, 2002

(51) Int. Cl.[7] ............................................. G05D 9/00
(52) U.S. Cl. .................. 700/297; 700/22; 700/286; 700/298; 318/143; 318/434; 318/453; 318/812; 307/24
(58) Field of Search ............................... 700/286, 297, 700/298, 22; 323/266, 267; 318/143, 434, 453, 812; 307/24, 31, 35, 38, 39, 40

(56) References Cited

U.S. PATENT DOCUMENTS

| | | |
|---|---|---|
| 1,308,068 A | 7/1919 | Hellmund |
| 1,329,243 A | 1/1920 | Hellmund |
| 1,662,083 A | 3/1928 | Stoller et al. |
| 2,234,747 A | 3/1941 | Crever et al. |
| 2,330,638 A | 9/1943 | Stratton |
| 2,420,881 A | 5/1947 | Jenks |
| 2,734,160 A | 2/1956 | Franks et al. |
| 2,745,049 A | 5/1956 | Holland |
| 2,740,079 A | 6/1956 | Montgomery |
| 2,919,393 A | 12/1959 | Peterson |
| 3,504,256 A | 3/1970 | Metcalfe |
| 4,300,182 A | * 11/1981 | Schweitzer, III ............. 361/79 |
| 5,483,153 A | * 1/1996 | Leeb et al. ............. 324/76.12 |
| 5,495,157 A | 2/1996 | Dade et al. |
| 5,525,874 A | 6/1996 | Mallarapu et al. |
| 5,604,425 A | * 2/1997 | Smith ......................... 323/267 |
| 5,651,667 A | 7/1997 | Sand et al. |
| 5,664,202 A | * 9/1997 | Chen et al. ................ 713/340 |
| 5,788,004 A | 8/1998 | Friedmann et al. |
| 5,878,189 A | 3/1999 | Lankin et al. |
| 5,898,282 A | 4/1999 | Drozdz et al. |
| 5,939,794 A | 8/1999 | Sakai et al. |
| 6,157,555 A | * 12/2000 | Hemena et al. ............... 363/71 |
| 6,208,931 B1 | 3/2001 | Schoettle et al. |
| 6,296,636 B1 | * 10/2001 | Cheng et al. ................. 606/32 |
| 6,359,410 B1 | * 3/2002 | Randolph ................... 318/599 |
| 6,429,728 B1 | * 8/2002 | Zabinski ..................... 327/540 |

FOREIGN PATENT DOCUMENTS

SU     838-887     10/1979

* cited by examiner

Primary Examiner—Leo Picard
Assistant Examiner—Carlos Ortiz-Rodriguez
(74) Attorney, Agent, or Firm—Douglas A. Mullen, Esq.

(57) ABSTRACT

A control system (10) actively limits the power drawn from a main power distribution bus (20) by one or more electric loads (30). The system (10) includes circuitry (14) for determining a maximum permissible current magnitude that may be supplied to the loads (30) based on a signal representative of the voltage magnitude supplied to the loads (30). Additional circuitry (18, 34) limits the power drawn from the main power distribution bus (20) to the maximum permissible current magnitude from exceeding a predetermined maximum power level. As a result, the required design capacity of power generation components and the power distribution system can be reduced in size, weight, and cost.

43 Claims, 5 Drawing Sheets

SYSTEM AND METHOD FOR ACTIVELY LIMITING THE POWER DRAWN FROM A POWER DISTRIBUTION BUS

BACKGROUND OF THE INVENTION

The present invention relates to a system and method for limiting power drawn by a load. More particularly, the invention relates to a system and method for actively limiting the electric power drawn from a power distribution bus by one or more electric motor loads.

Electric motor loads are installed and utilized in various environments in which size, weight, and cost are limiting variables. For example, modern aircraft, both for commercial and military applications, are now being designed with electrically powered actuation systems. Such actuation systems increase the electric load on the aircraft's main electric power distribution system. The electric power demand of electric actuation systems is determined by actuator speed and the load on the actuator. It is difficult, however, to design the power distribution system for the full range of load that the actuators may naturally encounter over the entire operating envelope of the aircraft. Hence, to ensure that the power distribution system can provide the needed power to the actuators over the entire operating envelope, including both normal load and unusually high load transients, the power generation and distribution system must be designed with a sufficiently conservative design margin.

Although a conservative design margin provides for a rather robust power generation and distribution system, it also results in increased size, weight, and cost in the manufacture of the aircraft. Moreover, the components that make up the controllers for the actuation system motors need to be robustly designed to meet the conservative design power requirements, which also increases size, weight, and cost.

Hence, there is a need for a system and method for limiting the power that is drawn from a main power distribution bus by one or more electric motor loads that solves at least the above-described problems. Namely, a system and method for actively limiting the power drawn from the main power distribution bus by one or more electric motor loads so that the required design capacity of both the generation and distribution system, and the motor controllers, can be reduced, resulting in reduced size, weight, and cost.

SUMMARY OF THE INVENTION

In one embodiment of the present invention, a control system for actively limiting the power drawn from a power distribution bus by one or more electrical loads to a predetermined maximum power level includes current based power limit determination means and power limiting means. The current based power limit determination means receives at least a signal representative of a voltage magnitude supplied to the one or more electrical loads, determines a maximum permissible current magnitude, based on the received signal, that may be supplied to the one or more electrical loads from the power distribution bus to prevent the electrical power drawn therefrom from exceeding the predetermined maximum power level, and generates a power limited current command signal based on the determined maximum permissible current magnitude. The power limiting means, in response to the power limited current command signal, limits the power drawn from the power distribution bus to the maximum permissible power level.

In another aspect of the present invention, a control system for actively limiting electrical power drawn from a power distribution bus by one or more electrical loads to a predetermined maximum power level includes voltage based power limit determination means and power limiting means. The voltage based power limit determination means receives at least a signal representative of a current magnitude supplied to the one or more electrical loads, determines a maximum permissible voltage magnitude, based on the received signal, that may be supplied to the one or more electrical loads from the power distribution bus to prevent the electrical power drawn therefrom from exceeding the predetermined maximum power level, and generates a power limited voltage command signal based on the determined maximum permissible voltage magnitude. The power limiting means, in response to the power limited voltage command signal, limits the power drawn from the power distribution bus to the maximum permissible power level.

In yet a further aspect of the present invention, a control system for actively limiting electrical power drawn from a power distribution bus by one or more electrical loads to a predetermined maximum power level includes current based power limit determination means, voltage command determination means, voltage based power limit determination means, and power limiting means. The current based power limit determination means receives at least a signal representative of a voltage magnitude supplied to the one or more electrical loads, determines a maximum permissible current magnitude, based on the received signal, that may be supplied to the one or more electrical loads from the power distribution bus to prevent the electrical power drawn therefrom from exceeding the predetermined maximum power level, and generates a power limited current command signal based on the determined maximum permissible current magnitude. The voltage command determination means receives the power limited current command signal and a signal representative of a current magnitude supplied to the one or more electrical loads, determines a voltage magnitude to be supplied to the one or more electrical loads from the power distribution bus, and generates a voltage command signal. The voltage based power limit determination means receives at least the voltage command signal and a signal representative of a current magnitude supplied to the one or more electrical loads, determines a maximum permissible voltage magnitude, based on the received current magnitude signal, that may be supplied to the one or more electrical loads from the power distribution bus to prevent the electrical power drawn therefrom from exceeding the predetermined maximum power level, and generates a power limited voltage command signal based on the determined maximum permissible voltage magnitude. The power limiting means, in response to the power limited voltage command signal, limits the power drawn from the power distribution bus to the maximum permissible power level.

Other features and advantages of the present invention will become apparent from the following detailed description, taken in conjunction with the accompanying drawings, which illustrate, by way of example, the principles of the invention.

DETAILED DESCRIPTION OF THE INVENTION

Before proceeding with the description of the invention, clarification of some of the terminology used throughout the disclosure will first be provided. Specifically, the disclosure uses the term "predetermined power level." In a preferred embodiment, the predetermined power level is the design power level of the main power distribution system into which the present invention is installed. It should be appreciated, however, that the present invention is not limited to the predetermined power level being the design power level. Indeed, the predetermined power level could be any power level drawn from a power distribution system, by one or more electrical loads, that is required or desired not to be exceeded. Additionally, it should be noted that for purposes of this disclosure, the term "motor load" includes both an electric motor 32 and any concomitant power conditioning circuitry 34 (see FIG. 1). The power conditioning circuitry 34, which may encompass various designs, such as an inverter or driver, controls the delivery of power from a main power distribution bus 20 to the electric motor 32.

Figure 1:
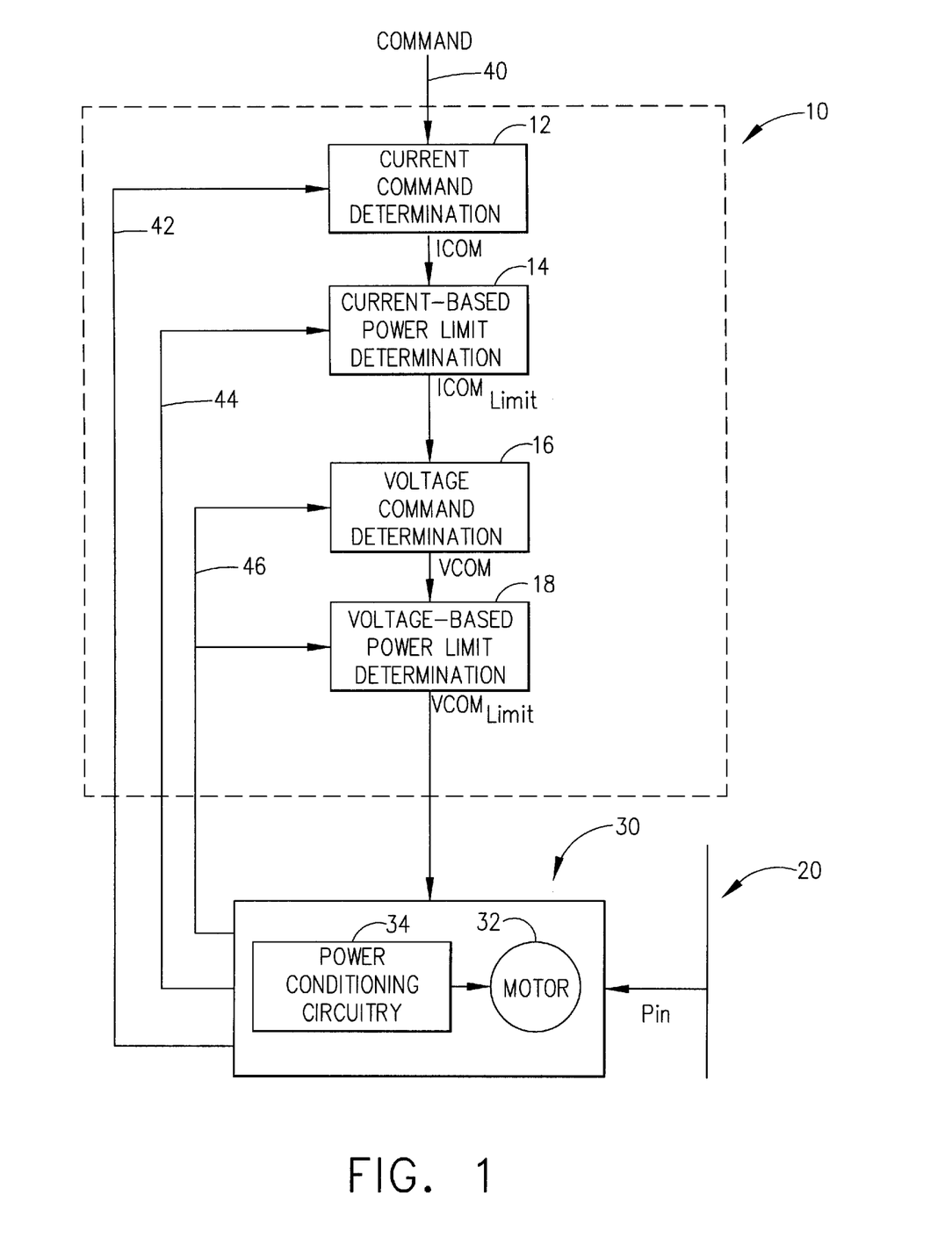
FIG. 1 is a functional block diagram of a controller circuit according to a preferred embodiment of the present.

Turning now to the description, a functional block diagram of a motor controller circuit 10 that implements the power limiting function of the present invention is depicted in FIG. 1. The controller circuit 10 is electrically coupled between a main power distribution bus 20 and a motor load 30.

The controller circuit 10 comprises at least four functional circuits for actively limiting the power drawn from the main power distribution bus 20 by the motor load 30. These functional circuits include current command determination circuitry 12, current based power limit determination circuitry 14, voltage command determination circuitry 16, and voltage based power limit determination circuitry 18. It will be appreciated that the controller circuit 10 may include other functional circuitry as well; however, for clarity, only these four functional circuits are depicted and described. It will further be appreciated that four functional circuits is only exemplary of a preferred embodiment, and that these functional circuits could be combined.

The current command determination circuitry 12 receives an input command signal 40 and provides a current command signal (ICOM) representative of the current magnitude that should be drawn by the motor load 30. In a speed control implementation, such as depicted in FIG. 1, the input command signal 40 is representative of the desired speed and rotational direction of the motor 32. Additionally, in this implementation, the current command determination circuitry 12 receives a feedback signal 42 representative of the actual rotational speed of the motor 32. The current command signal (ICOM) is generated based on a comparison of the commanded rate signal 40 with the feedback signal 42.

The current based power limit determination circuitry 14 receives the current command signal (ICOM) and a signal 44 representative of the voltage magnitude supplied from the main power distribution bus 20 to the motor load 30. The current based power limit determination circuitry 14 uses these signals to determine the current magnitude that should be supplied to the motor load 30. Specifically, the current based power limit determination circuitry 14 determines, based on the supplied voltage magnitude signal, the maximum permissible current magnitude that may be supplied to the motor load 30 from the main power distribution bus 20 to prevent the power drawn from the main power distribution bus 20 from greatly exceeding the predetermined power level. From this maximum permissible current magnitude determination, the current based power limit determination circuitry 14 generates a "maximum" current command signal ($ICOM_{MAX}$). This maximum current command signal ($ICOM_{MAX}$) is compared to the current command signal (ICOM) received from the current command determination circuitry 12, and a "power limited" current command signal ($ICOM_{limit}$) is output on the basis of this comparison. For instance, if the current command signal (ICOM) exceeds the maximum current command signal ($ICOM_{MAX}$), then this indicates that the main power distribution bus 20 will be supplying power to the motor load 30 in excess of the predetermined power level. Thus, the power limited command signal ($ICOM_{limit}$) output from the current based power limit determination circuitry 14 is the lesser in magnitude of the maximum current command signal ($ICOM_{MAX}$) and the current command signal (ICOM).

It will be appreciated that the maximum permissible current determination performed by the current based power limit determination circuitry 14 described above, may be implemented using either analog or digital circuitry. If digital circuitry is utilized, then the determination may be made by a straightforward software driven calculation, by utilizing one or more look-up tables, by a combination thereof, or by other numerous methods known in the art.

It is further noted that the signal representative of the voltage magnitude supplied to the motor load 30 is generated using one of numerous methods known in the art. For instance, the signal may be based on a voltage magnitude that is sensed directly. Alternatively, the signal may be based on a voltage magnitude that is estimated from various operational or design parameters of the motor load 30. For example, the voltage magnitude may be estimated based on a sensed rotational speed of the motor load 30, from motor design parameters such as back EMF. If the motor load 30 is a multi-phase motor, then different phase voltages may be determined directly or estimated from operational or design parameters.

The voltage command determination circuitry 16, receives the power limited current command signal ($ICOM_{limit}$) from the current based power limit determination circuitry 14 and a signal 46 representative of the current magnitude supplied from the main power distribution bus 20 to the motor load 30. The voltage command determination circuitry 16 uses these signals to generate a voltage command signal (VCOM). The voltage command signal (VCOM) is a signal representative of the voltage magnitude that should be supplied to the motor load 30, based on the received power limited current command signal ($ICOM_{limit}$). The voltage command signal (VCOM) is then transmitted to the voltage based power limit determination circuitry 18.

The voltage based power limit determination circuitry 18 functions similar to the current based power limit determination circuitry 14, in that it determines the maximum permissible voltage magnitude, based on the supplied current magnitude signal, that may be supplied to the motor load 30 from the main power distribution bus 20 to prevent the power drawn from the main power distribution bus 20 from exceeding the predetermined power level. Specifically, the voltage based power limit determination circuitry 18 receives the voltage command signal (VCOM) and a signal 46 representative of the current magnitude supplied from the main power distribution bus 20 to the motor load 30. The voltage limit determination circuitry 18 then uses these signals to determine the maximum voltage magnitude that should be supplied to the motor load 30. As with the current based power limit determination circuitry 14, from the determined maximum voltage magnitude, the voltage based power limit determination circuitry 18 generates a "maximum" voltage command signal ($VCOM_{MAX}$). This maximum voltage command signal ($VCOM_{MAX}$) is compared to the voltage command signal (VCOM) received from the voltage command determination circuitry 16, and a "power limited" voltage command signal ($VCOM_{limit}$) is output on the basis of this comparison. Specifically, if the voltage command signal (VCOM) exceeds the maximum voltage command signal ($VCOM_{MAX}$), then this indicates that the main power distribution bus 20 will be supplying power to the motor load 30 in excess of the predetermined power level. Thus, the power limited voltage current command signal ($VCOM_{limit}$) output from the voltage based power limit determination circuitry 18 is the lesser in magnitude of the maximum voltage command signal ($VCOM_{MAX}$) and the voltage command signal (VCOM).

Again, as with the signal representative of the voltage magnitude, the signal representative of the current magnitude supplied to the motor load 30 is also generated using one of numerous methods known in the art. For instance, the signal may be based on a current magnitude that is sensed directly. Alternatively, the signal may be based on a current magnitude that is estimated from various operational or design parameters of the motor load 30. Moreover, it will be appreciated that the maximum permissible voltage determination performed by the voltage based power limit determination circuitry 18, may be implemented using either analog or digital circuitry. If digital circuitry is utilized, then the determination may be made by a straightforward software driven calculation, by utilizing one or more look-up tables, by a combination thereof, or by other numerous methods known in the art.

As discussed above, the motor load 30, as defined herein, includes not only the electric motor 32, but the power conditioning circuitry 34 as well. The power conditioning circuitry 34 receives a power signal (Pin) from the main power distribution bus 20 and the power limited voltage command signal ($VCOM_{limit}$) output by the voltage based power limit determination circuitry 18, as described above. The power conditioning circuitry 34, based on this signal, provides a properly conditioned signal to the electric motor 32 that ensures the power drawn from the main power distribution bus 20 does not exceed the predetermined power level. The specific signal conditioning performed by the power conditioning circuitry 34 will depend on the type of electric motor 32 (e.g., AC or DC) that is being used.

Figure 2:
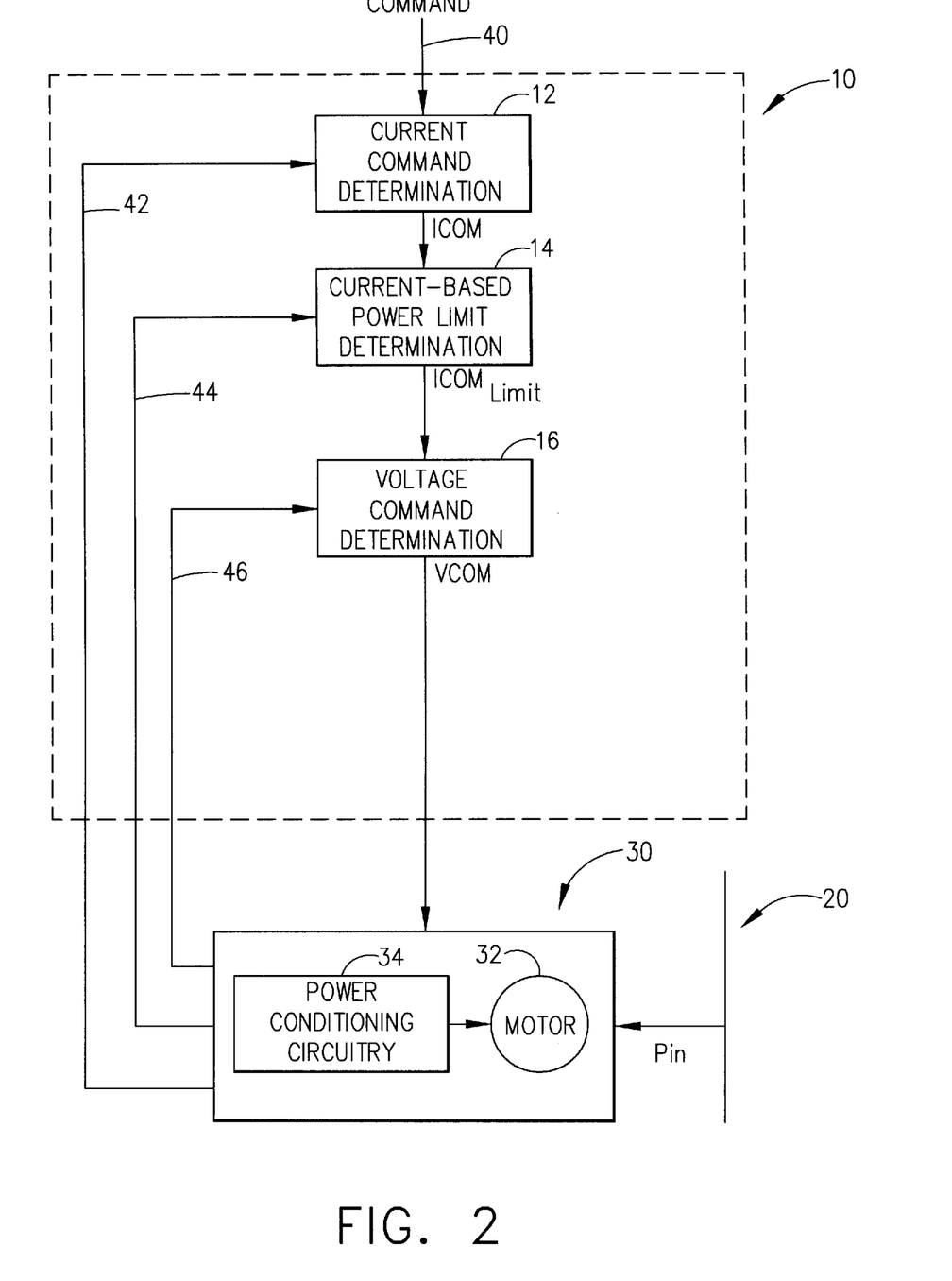
FIG. 2 is a functional block diagram of a controller circuit according to an alternative embodiment of the present.
Figure 3:
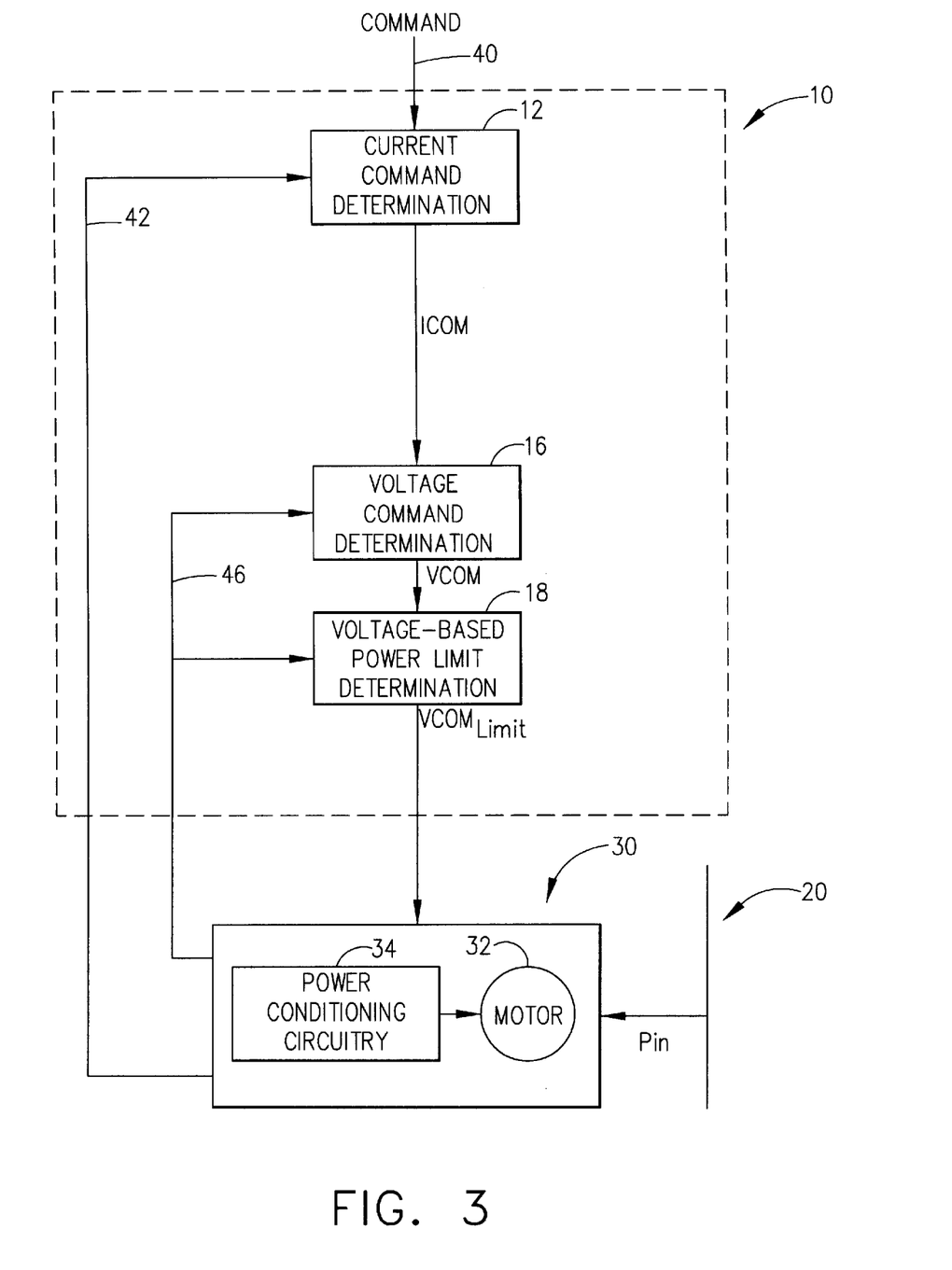
FIG. 3 is a functional block diagram of a controller circuit according to yet another alternative embodiment of the present

The preferred embodiment depicted in FIG. 1 includes two limit determination circuits, the current based power limit determination circuitry 14 and the voltage based power limit determination circuitry 18. It should be appreciated, however, that this is only exemplary of the preferred embodiment for carrying out the present invention. Indeed, in one alternative embodiment, depicted in FIG. 2, only the current based power limit determination circuitry 14 is used. And, in a second alternative embodiment depicted in FIG. 3, only the voltage based power limit determination circuitry 18 is utilized.

Having described the controller circuit 10 and the various functional circuits comprising the controller circuit 10, the overall method carried out by the controller circuit 10 will now be described. In doing so, reference should be made to FIG. 4, which depicts the methodological process flow 100. In this discussion, the parenthetical references to "STEPs" correspond to the particular reference numerals of the methodological flow 100 depicted in FIG. 4. Initially, the process 100 starts when the motor load 30 is, in some way, commanded to be energized (STEP 102). A current magnitude necessary to rotate the motor load 30 at the desired speed and direction is determined, and a current command (ICOM) is generated on the basis of this determination (STEP 104). Thereafter, the motor load 30 is energized (STEP 106), and signals representative of the voltage and current magnitudes supplied from the main power distribution bus 20 to the motor load 30 is determined (STEP 108). The maximum allowable current ($ICOM_{MAX}$) corresponding to the determined supply voltage, which ensures that the predetermined power level is not exceeded, is then determined (STEP 110). The magnitude of the commanded current (ICOM) and determined maximum allowable current command ($ICOM_{MAX}$) are compared, and the lesser of the two is output as the power limited current command signal ($ICOM_{limit}$), which is used to determine the appropriate voltage command (STEP 112).

Figure 4:
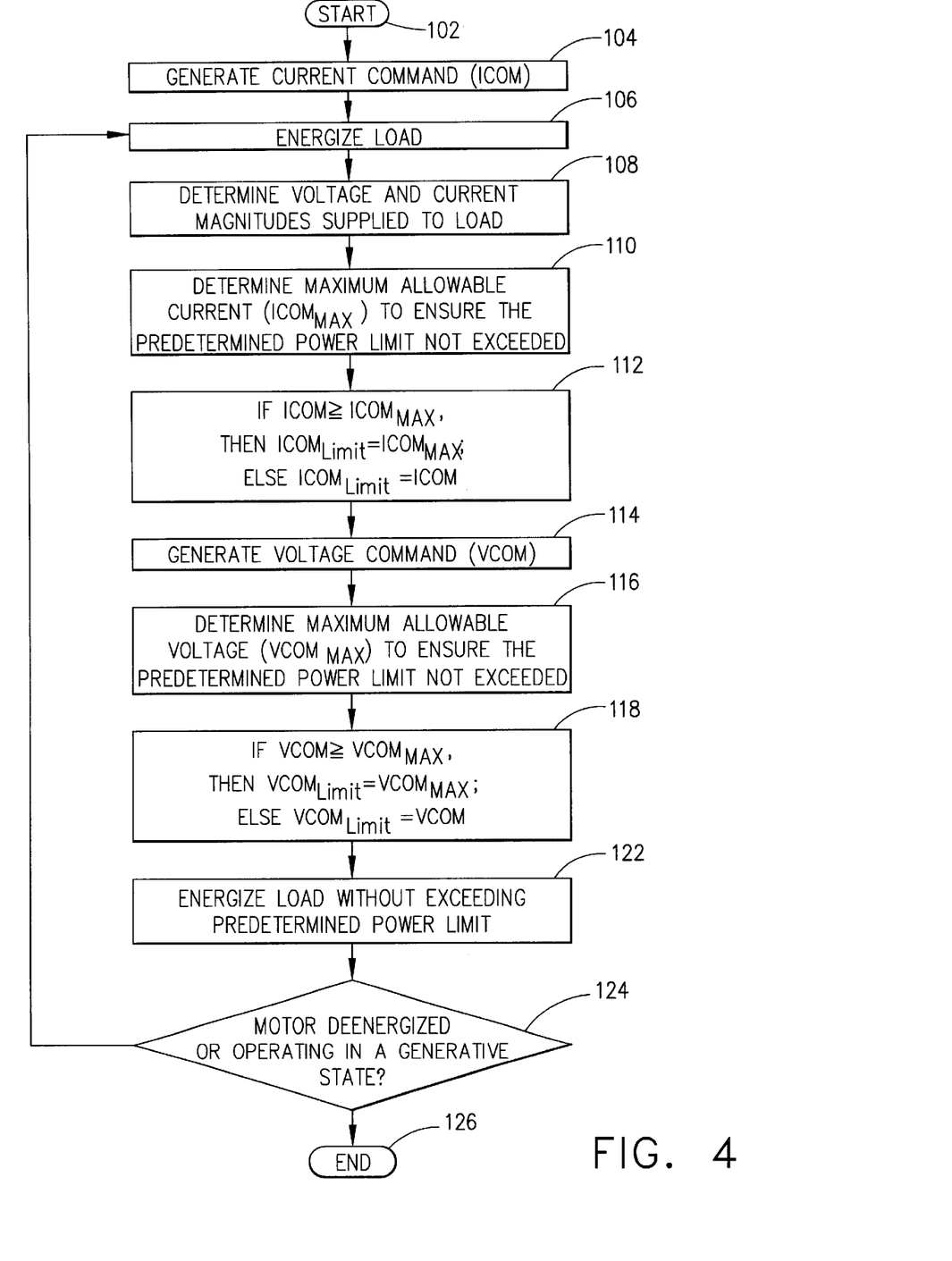
FIG. 4 is a flowchart depicting the method of actively limiting the power drawn by one or more electric loads according to the preferred embodiment of the present invention.

The voltage magnitude necessary to provide the commanded current is determined based on ($ICOM_{limit}$) and the determined supply current, and a voltage command (VCOM) is generated on the basis of this determination (STEP 114). The maximum allowable voltage ($VCOM_{MAX}$) corresponding to the determined supply current, which ensures that predetermined power level is not exceeded, is then determined (STEP 116). The magnitude of the commanded voltage (VCOM) and determined maximum allowable voltage command ($VCOM_{MAX}$) are compared, and the lesser of the two is output as the power limited voltage command signal ($VCOM_{limit}$) (STEP 118), which is used to limit the power drawn from the main power distribution bus 20 to the maximum allowable power (STEP 122).

The above-described process 100 continues until the motor load 30 is commanded to be deenergized or is operating in a generative state (STEP 124), which is described in more detail below. Once this occurs, the process 100 ends (STEP 126) until the motor load 30 is once again operating in a motoring state or, if deenergized, is commanded to the energized state.

Figure 5A:
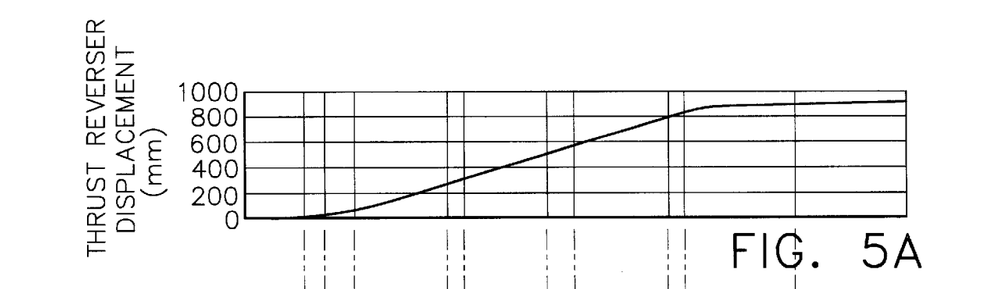
FIG. 5 illustrates various graphs depicting an operation of a thrust reverser actuation system during a deploy operation that implements the present invention.
Figure 5B:
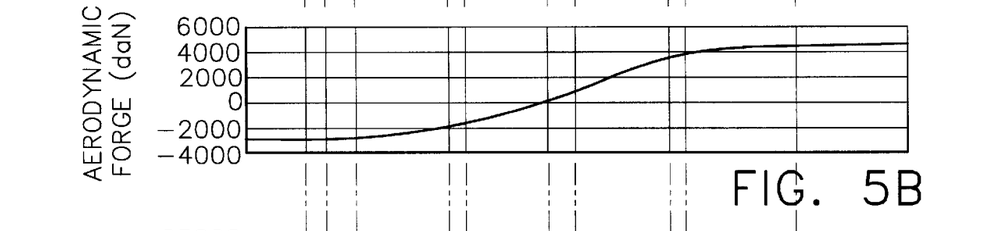
Figure 5C:
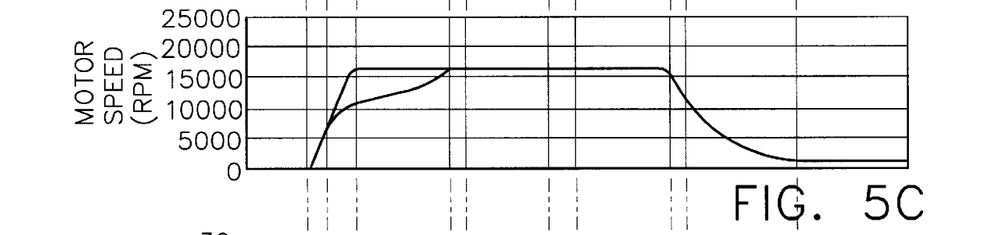
Figure 5D:
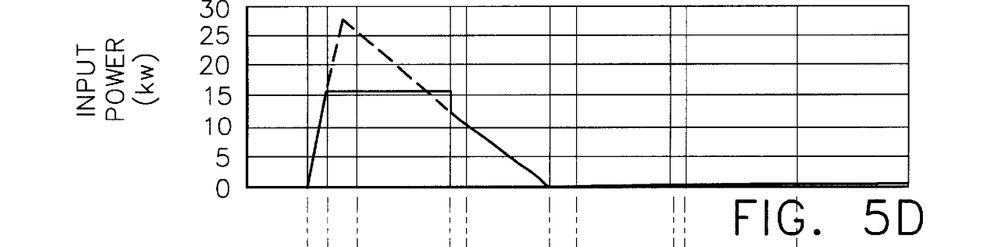
Figure 5E:
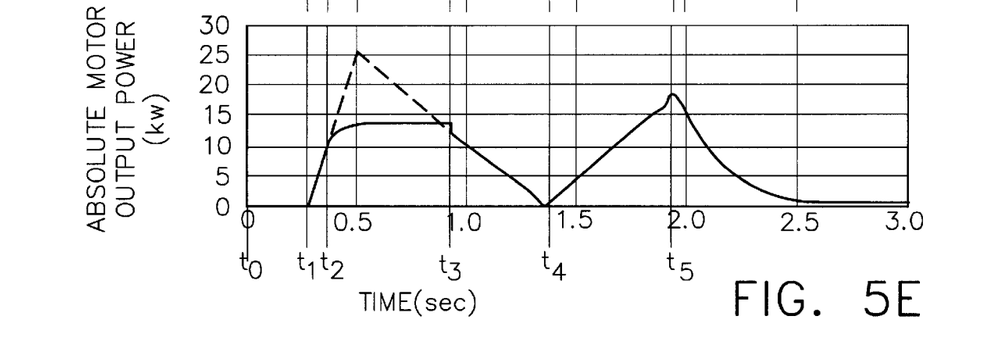

With the above description of the controller circuit 10 and process 100 in mind, an operation of a particular electric motor driven actuation system that utilizes the active power limiting apparatus and methodology of the present invention will now be described. More particularly, a deployment operation of an aircraft thrust reverser system that employs the apparatus and methodology will be described. In this regard, during the following discussion attention should be turned to FIGS. 5A–5E, which are various graphs depicting an operation of a thrust reverser actuation system during the thrust reverser deployment operation. Specifically, FIG. 5A depicts the displacement of a thrust reverser versus time; FIG. 5B depicts the aerodynamic forces on the thrust reverser versus time; FIG. 5C depicts motor speed versus time; FIG. 5D depicts the power drawn from the main power supply bus 20 by the motor load 30; and FIG. 5E depicts the absolute valve of motor power (e.g., based on torque and speed) of the motor load 30. For this particular operation, the predetermined maximum power level is the design power of the main power supply bus 20, which is 15.5 kW per motor load 30, and the desired steady-state rotational speed of the motor 32 is 16,000 revolutions-per-minute (rpm). Additionally, it should be noted that the dotted lines on the graphs depict the system response without the active power limiting method of the present invention. It will be appreciated that the system values depicted and described herein are only exemplary of one particular preferred embodiment, and that other values may be chosen based on the specific design criteria of the system employing the present invention.

With the above in mind, the description of the thrust reverser deployment operation will now be provided. At time $t_0$, when the pilot commands the thrust reversers to be deployed, the aerodynamic forces are resisting the movement of the thrust reversers to the deployed position. At time $t_1$, after the thrust reverser locks are disengaged, the motor 30 is energized to rotate in the required direction. As can be seen, the input power to the motor load 30 begins to rise (FIG. 5D) in order to overcome the resistive aerodynamic forces acting on the thrust reversers (FIG. 5B). As a result, both the motor rotational speed (FIG. 5C) and the output power of the motor (FIG. 5E) increase, to allow the thrust reversers to begin movement (FIG. 5A).

The input power (FIG. 5D), motor speed (FIG. 5C), and motor output power (FIG. 5E) continue to steadily increase, to overcome the resistive aerodynamic forces (FIG. 5B) and displace the thrust reversers (FIG. 5A), until time $t_2$. At that time, power drawn from the main power distribution bus 20 reaches the predetermined maximum power level which, as noted above, is 15.5 kW. Hence, the power drawn is clamped at 15.5 kW, which results in a concomitant clamping of the motor output power (FIG. 5E). Additionally, during this particular operation, as the thrust reversers begin to move toward the deployed position (FIG. 5A), the resistive aerodynamic forces acting against their movement begins to decrease (FIG. 5B). Thus, although the input power is clamped at 15.5 kW, the rotational speed of the motor 30 continues to rise toward the desired steady-state rotational speed of 16,000 rpm, albeit at a reduced rate of acceleration (FIG. 5C).

Between time $t_2$ and $t_3$, the resistive aerodynamic forces continue to decline (FIG. 5B) as the thrust reversers continue to move toward the deployed position (FIG. 5A). At time $t_3$, the rotational speed of the motor 30 reaches the steady state operational speed of 16,000 rpm (FIG. 5C). Since the resistive aerodynamic loads continue to decrease (FIG. 5B) as the thrust reversers deploy (FIG. 5A), the power drawn by the motor load 30 to maintain the steady state speed also steadily decreases (FIG. 5D), as does the motor output power (FIG. 5E).

At time $t_4$, when the thrust reversers are at about the midway point of full deployment (FIG. 5A), the aerodynamic loads acting on the thrust reversers actually become positive (FIG. 5B). When this occurs, the thrust reversers will move toward the deployed position without the aid of the motor 32. Thus, the electrical power drawn by the motor load 30 is reduced to zero (FIG. 5D). However, the aerodynamic loads actually cause the motor 32 to operate as a generator, creating a dynamic braking effect, while operating at the steady state operational speed, which explains the increase in the absolute valve of the motor output power (FIG. 5E).

Operation at the steady state operational speed continues until, at time $t_5$, the thrust reversers reach a predetermined position (FIG. 5A). At that time, the motor 32 is commanded to rotate at a significantly reduced speed, allowing the thrust reversers to reach the deployed position at a lower speed to prevent system damage.

Although the description provided immediately above relates to use of the present invention in an aircraft environment, the skilled artisan will appreciate that the present invention is not so limited. Indeed, the present invention may be incorporated in numerous environments where it is desirable and/or necessary to limit the power drawn by a load, such as a motor load, to a predetermined level. For example, an electrically propelled automobile is another environment for which the present invention is useful. Moreover, although the disclosure explicitly describes the load being supplied as a motor load, the present invention is not limited thereto. Rather, the present invention is useful with many other types of electrical loads.

The circuit components of the present invention may be formed of either discrete components, or incorporated into a single integrated circuit. Additionally, while the functional blocks are depicted and described as separate physical blocks, this is only done for clarity in presenting and describing the invention. It will be appreciated that two or more of the functional blocks may be combined into a single physical structure. Moreover, the present invention is not limited to a particular motor control scheme, such as the speed control scheme explicitly described herein as a preferred embodiment, but includes other control schemes, such as those that directly control torque (e.g., a "dq" type of control scheme). Furthermore, the process carried out by the circuit components may be realized using software driven devices, or carried out using analog devices and signals, or a combination of both.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A control system for actively limiting electrical power drawn from a power distribution bus by one or more electrical loads to a predetermined maximum power level, comprising:

current based power limit determination means for (i) receiving at least a signal representative of a voltage magnitude supplied to the one or more electrical loads, (ii) determining a maximum permissible current magnitude, based on the received signal, that may be supplied to the one or more electrical loads from the power distribution bus to prevent the electrical power drawn therefrom from exceeding the predetermined maximum power level and (iii) generating a power limited current command signal based on the determined maximum permissible current magnitude; and power limiting means, responsive to the power limited current command signal, for limiting the power drawn from the power distribution bus to the maximum permissible power level.

2. The control system of claim 1, wherein said power limiting means comprises:

voltage command determination means for (i) receiving the power limited current command signal and a signal representative of a current magnitude supplied to the one or more electrical loads (ii) determining a voltage magnitude to be supplied to the one or more electrical loads from the power distribution bus and (iii) generating a voltage command signal; and power conditioning means, responsive to the voltage command signal, for providing a conditioned power signal to the one or more electrical loads at or below the predetermined power limit.

3. The control system of claim 1, further comprising:

current command determination means for (i) receiving a command signal representative of a desired current magnitude to be supplied to the one or more electrical loads and (ii) generating a current command signal, wherein said current command determination means receives the current command signal and generates the power limited current command signal based on the determined maximum permissible current magnitude and the current command signal.

4. The control system of claim 1, wherein said current based power limit determination means determines the maximum permissible current magnitude based on the received signal and power losses in said power limiting means.

5. The control system of claim 2, wherein said power conditioning means receives the power drawn from the power distribution bus and (ii) provides the conditioned power signal to the one or more electrical loads at or below the predetermined power limit.

6. The control system of claim 1, wherein the signal representative of the voltage magnitude supplied to the one or more electrical loads is generated by a voltage sensing device.

7. The control system of claim 1, the signal representative of the voltage magnitude supplied to the one or more electrical loads is generated by estimation means, wherein said estimation means estimates the magnitude of the voltage supplied to the one or more loads based on one or more operational parameters.

8. The control system of claim 7, wherein the one or more electrical loads each comprises a motor load, and wherein the operational parameters include rotational speed of the one or more motor loads.

9. The control system of claim 7, wherein the operational parameters include a back EMF constant of the motor loads.

10. A control system for actively limiting electrical power drawn from a power distribution bus by one or more electrical loads to a predetermined maximum power level, comprising:

voltage based power limit determination means for (i) receiving at least a signal representative of a current magnitude supplied to the one or more electrical loads, (ii) determining a maximum permissible voltage magnitude, based on the received signal, that may be supplied to the one or more electrical loads from the power distribution bus to prevent the electrical power drawn therefrom from exceeding the predetermined maximum power level and (iii) generating a power limited voltage command signal based on the determined maximum permissible voltage magnitude; and power limiting means, responsive to the power limited voltage command signal, for limiting the power drawn from the power distribution bus to the maximum permissible power level.

11. The control system of claim 10, wherein said power limiting means comprises:

power conditioning means, responsive to the power limited voltage command signal, for providing a conditioned power signal to the one or more electrical loads at or below the predetermined power limit.

12. The control system of claim 10, further comprising:

voltage command determination means for (i) receiving a command signal representative of a desired current magnitude to be supplied to the one or more electrical loads (ii) the signal representative of the current magnitude supplied to the one or more electrical loads and (ii) generating a voltage command signal, wherein said voltage based power limit determination means receives the voltage command signal and generates the power limited voltage command signal based on the determined maximum permissible voltage magnitude and the voltage command signal.

13. The control system of claim 10, wherein said voltage based power limit determination means determines the maximum permissible voltage magnitude based on the received signal and power losses in said power limiting means.

14. The control system of claim 11, wherein said power conditioning means receives the power drawn from the power distribution bus and provides the conditioned power signal to the one or more electrical loads at or below the predetermined power limit.

15. The control system of claim 10, wherein the signal representative of the current magnitude supplied to the one or more electrical loads is generated by a current sensing device.

16. A control system for actively limiting electrical power drawn from a power distribution bus by one or more electrical loads to a predetermined maximum power level, comprising:

current based power limit determination means for (i) receiving at least a signal representative of a voltage magnitude supplied to the one or more electrical loads (ii) determining a maximum permissible current magnitude, based on the received signal, that may be supplied to the one or more electrical loads from the power distribution bus to prevent the electrical power drawn therefrom from exceeding the predetermined maximum power level and (iii) generating a power limited current command signal based on the determined maximum permissible current magnitude;

voltage command determination means for (i) receiving the power limited current command signal and a signal representative of a current magnitude supplied to the one or more electrical loads (ii) determining a voltage magnitude to be supplied to the one or more electrical loads from the power distribution bus and (iii) generating a voltage command signal; and voltage based power limit determination means for (i) receiving at least the voltage command signal and a signal representative of a current magnitude supplied to the one or more electrical loads (ii) determining a maximum permissible voltage magnitude, based on the received current magnitude signal, that may be supplied to the one or more electrical loads from the power distribution bus to prevent the electrical power drawn therefrom from exceeding the predetermined maximum power level and (iii) generating a power limited voltage command signal based on the determined maximum permissible voltage magnitude; and power limiting means, responsive to the power limited voltage command signal, for limiting the power drawn from the power distribution bus to the maximum permissible power level.

17. The control system of claim 16, further comprising:
current command determination means for (i) receiving a command signal representative of a desired current magnitude to be supplied to the one or more electrical loads and (ii) generating a current command signal,
wherein said current command determination means receives the current command signal and generates the power limited current command signal based on the determined maximum permissible current magnitude and the current command signal.

18. The control system of claim 16, wherein said current based power limit determination means determines the maximum permissible current magnitude based on the signal representative of the voltage magnitude supplied to the one or more electrical loads and power losses in said power limiting means.

19. The control system of claim 16, wherein the signal representative of the voltage magnitude supplied to the one or more electrical loads is generated by a voltage sensing device.

20. The control system of claim 16, the signal representative of the voltage magnitude supplied to the one or more electrical loads is generated by estimation means,
wherein said estimation means estimates the magnitude of the voltage supplied to the one or more loads based on one or more operational parameters.

21. The control system of claim 20, wherein the one or more electrical loads each comprises a motor load, and wherein the operational parameters include rotational speed of the one or more motor loads.

22. The control system of claim 21, wherein the operational parameters include a back EMF constant of the motor loads.

23. A method for actively limiting electrical power drawn from a power distribution bus by one or more electrical loads to a predetermined maximum power level, comprising:
determining a maximum permissible current magnitude that may be supplied to the one or more electrical loads from the power distribution bus to prevent the electrical power drawn therefrom from exceeding the predetermined maximum power level, based on a signal representative of a voltage magnitude supplied to the one or more electrical loads;
generating a power limited current command signal based on the determined maximum permissible current magnitude; and
limiting the power drawn from the power distribution bus to the maximum permissible power level in response to the power limited current command signal.

24. The method of claim 23, wherein the step of limiting the power drawn comprises:
determining a voltage magnitude to be supplied to the one or more electrical loads from the power distribution bus, based on a signal representative of a current magnitude supplied to the one or more electrical loads; and
providing a conditioned power signal to the one or more electrical loads at or below the predetermined power limit power conditioning means in response to the voltage command signal.

25. The method of claim 23, further comprising:
generating a current command signal in response to a received command signal representative of a desired current magnitude to be supplied to the one or more electrical loads,
wherein the power limited current command signal is generated based on the determined maximum permissible current magnitude and the current command signal.

26. The method of claim 23, wherein the maximum permissible current magnitude determination is based on the signal representative of the voltage magnitude and estimated predetermined power losses.

27. The method of claim 23, wherein the signal representative of the voltage magnitude supplied to the one or more electrical loads is generated by a voltage sensing device.

28. The method of claim 23, wherein the signal representative of the voltage magnitude supplied to the one or more electrical loads is estimated based on one or more operational parameters.

29. The method of claim 28, wherein the one or more electrical loads each comprises a motor load, and wherein the operational parameters include rotational speed of the one or more motor loads.

30. The method of claim 29, wherein the operational parameters include a back EMF constant of the motor loads.

31. A method for actively limiting electrical power drawn from a power distribution bus by one or more electrical loads to a predetermined maximum power level, comprising:
determining a maximum permissible voltage magnitude that may be supplied to the one or more electrical loads from the power distribution bus to prevent the electrical power drawn therefrom from exceeding the predetermined maximum power level, based on a signal representative of a current magnitude supplied to the one or more electrical loads;
generating a power limited voltage command signal based on the determined maximum permissible voltage magnitude; and
limiting the power drawn from the power distribution bus to the maximum permissible power level in response to the power limited voltage command signal.

32. The method of claim 31, wherein the step of limiting the power drawn comprises:
providing a conditioned power signal to the one or more electrical loads at or below the predetermined power limit power conditioning means in response to the voltage command signal.

33. The method of claim 31, further comprising:
generating a voltage command signal in response to a received command signal representative of a desired current magnitude to be supplied to the one or more electrical loads,
wherein the power limited voltage command signal is generated based on the determined maximum permissible voltage magnitude and the voltage command signal.

34. The method of claim 31, the maximum permissible voltage magnitude is determined based on the signal representative of a current magnitude and estimated predetermined power losses.

35. The method of claim 31, wherein the signal representative of the current magnitude supplied to the one or more electrical loads is generated by a voltage sensing device.

36. The method of claim 31, the signal representative of the voltage magnitude supplied to the one or more electrical loads is generated by estimating the magnitude of the current supplied to the one or more loads based on one or more operational parameters.

37. A method for actively limiting electrical power drawn from a power distribution bus by one or more electrical loads to a predetermined maximum power level, comprising:

determining a maximum permissible current magnitude that may be supplied to the one or more electrical loads from the power distribution bus to prevent the electrical power drawn therefrom from exceeding the predetermined maximum power level, based on a signal representative of a voltage magnitude supplied to the one or more electrical loads;

generating a power limited current command signal based on the determined maximum permissible current magnitude determining a voltage magnitude to be supplied to the one or more electrical loads from the power distribution bus, based on the power limited current command signal and a signal representative of a current magnitude supplied to the one or more electrical loads;

generating a voltage command signal based on the determined voltage magnitude;

determining a maximum permissible voltage magnitude that may be supplied to the one or more electrical loads from the power distribution bus to prevent the electrical power drawn therefrom from exceeding the predetermined maximum power level, based on the voltage command signal and the signal representative of the current magnitude supplied to the one or more electrical loads;

generating a power limited voltage command signal based on the determined maximum permissible voltage magnitude; and limiting the power drawn from the power distribution bus to the maximum permissible power level in response to the power limited voltage command signal.

38. The method of claim 37, further comprising:

generating a current command signal in response to a received command signal representative of a desired current magnitude to be supplied to the one or more electrical loads, wherein the power limited current command signal is generated based on the determined maximum permissible current magnitude and the current command signal.

39. The method of claim 37, wherein the maximum permissible current magnitude determination is based on the signal representative of the voltage magnitude and estimated predetermined power losses.

40. The method of claim 37, wherein the signal representative of the voltage magnitude supplied to the one or more electrical loads is generated by a voltage sensing device.

41. The method of claim 37, wherein the signal representative of the voltage magnitude supplied to the one or more electrical loads is estimated based on one or more operational parameters.

42. The method of claim 41, wherein the one or more electrical loads each comprises a motor load, and wherein the operational parameters include rotational speed of the one or more motor loads.

43. The method of claim 42, wherein the operational parameters include a back EMF constant of the motor loads.

* * * * *